United States Patent
Raasch et al.

(10) Patent No.: US 10,636,280 B2
(45) Date of Patent: Apr. 28, 2020

(54) APPARATUS AND METHOD FOR DETERMINING MOUNTING STATE OF A TRAILER TRACKING DEVICE

(71) Applicant: Spireon, Inc., Irvine, CA (US)

(72) Inventors: Charles F. Raasch, Foothill Ranch, CA (US); Edward D. Suski, Mission Viejo, CA (US); Timothy J. Harvey, Temecula, CA (US)

(73) Assignee: Spireon, Inc., Irvine, CA (US)

( * ) Notice: Subject to any disclaimer, the term of this patent is extended or adjusted under 35 U.S.C. 154(b) by 0 days.

(21) Appl. No.: 16/178,698

(22) Filed: Nov. 2, 2018

(65) Prior Publication Data

US 2019/0279494 A1    Sep. 12, 2019

Related U.S. Application Data

(60) Provisional application No. 62/640,283, filed on Mar. 8, 2018.

(51) Int. Cl.
*G08B 25/10* (2006.01)
*G06Q 50/28* (2012.01)
(Continued)

(52) U.S. Cl.
CPC .............. *G08B 25/10* (2013.01); *G01S 13/04* (2013.01); *G01S 17/026* (2013.01); *G01V 3/08* (2013.01);
(Continued)

(58) Field of Classification Search
CPC ......... G01S 13/04; G01S 17/026; G01V 3/08; G06Q 50/28; G08B 25/10; H04W 4/80; H04W 84/12
See application file for complete search history.

(56) References Cited

U.S. PATENT DOCUMENTS

| | | | |
|---|---|---|---|
| 906,021 | A | 12/1908 | Herrick |
| 6,025,774 | A | 2/2000 | Forbes |

(Continued)

FOREIGN PATENT DOCUMENTS

| | | |
|---|---|---|
| CA | 2683208 A1 | 11/2008 |
| CA | 2837320 A1 | 11/2012 |

(Continued)

*Primary Examiner* — Omeed Alizada
(74) *Attorney, Agent, or Firm* — Luedeka Neely Group, P.C.

(57) ABSTRACT

A cargo tracking apparatus for detecting proximity to a cargo structure includes a cargo sensor, a location sensor, a wireless transmitter, and a processor, all disposed within a housing that is configured to be attached to the cargo structure. The cargo sensor, which is adjacent a sensor window in the housing, detects a portion of the cargo structure disposed near the sensor window and generates a cargo sensor signal based on detection or lack of detection of the cargo structure. The location sensor generates location information based on the location of the cargo tracking apparatus. The processor receives the cargo sensor signal and the location information, and based thereon generates alert messages that contain the location information and information indicative of whether the cargo structure is disposed near the cargo tracking apparatus. The wireless transmitter transmits the alert messages.

6 Claims, 6 Drawing Sheets

(51) Int. Cl.
*G01S 13/04* (2006.01)
*G01V 3/08* (2006.01)
*G01S 17/02* (2020.01)
*H04W 84/12* (2009.01)
*H04W 4/80* (2018.01)

(52) U.S. Cl.
CPC .............. *G06Q 50/28* (2013.01); *H04W 4/80* (2018.02); *H04W 84/12* (2013.01)

(56) References Cited

U.S. PATENT DOCUMENTS

| | | | |
|---|---|---|---|
| 6,249,217 | B1 | 6/2001 | Forbes |
| 7,034,683 | B2 | 4/2006 | Ghazarian |
| 7,102,510 | B2 | 9/2006 | Boling et al. |
| 7,215,282 | B2 | 5/2007 | Boling et al. |
| 7,366,551 | B1 | 4/2008 | Hartley |
| 7,546,151 | B2 | 6/2009 | Hartley |
| 7,675,423 | B2 | 3/2010 | Boling et al. |
| 7,818,098 | B2 | 10/2010 | Koepf et al. |
| 7,830,305 | B2 | 11/2010 | Boling et al. |
| 7,970,496 | B2 | 6/2011 | Koepf et al. |
| 8,018,332 | B2 | 9/2011 | Boling et al. |
| 8,368,561 | B2 | 2/2013 | Welch et al. |
| 8,452,673 | B2 | 5/2013 | Boling et al. |
| 8,462,021 | B2 | 6/2013 | Welch et al. |
| 8,510,200 | B2 | 8/2013 | Pearlman et al. |
| 8,760,274 | B2 | 6/2014 | Boling et al. |
| 8,933,802 | B2 | 1/2015 | Baade |
| 9,008,894 | B2 | 4/2015 | Bishop et al. |
| 9,070,271 | B2 | 6/2015 | Baade et al. |
| 9,316,737 | B2 | 4/2016 | Baade |
| 9,332,404 | B2 | 5/2016 | Boling et al. |
| 9,516,394 | B2 | 12/2016 | Carlo et al. |
| 9,551,788 | B2 | 1/2017 | Epler |
| 9,779,379 | B2 | 10/2017 | Hall et al. |
| 9,779,449 | B2 | 10/2017 | Meyer et al. |
| 10,089,598 | B2 | 10/2018 | Reeder et al. |
| 10,169,822 | B2 | 1/2019 | Jarvis et al. |
| 10,223,744 | B2 | 3/2019 | Brady et al. |
| 10,232,823 | B1 | 3/2019 | Bobay et al. |
| 10,255,824 | B2 | 4/2019 | Pearlman et al. |
| 2005/0026627 | A1 | 2/2005 | Boling et al. |
| 2005/0215194 | A1 | 9/2005 | Boling et al. |
| 2006/0007038 | A1 | 1/2006 | Boling et al. |
| 2007/0152844 | A1 | 7/2007 | Hartley et al. |
| 2008/0147245 | A1 | 6/2008 | Koepf et al. |
| 2008/0186135 | A1 | 8/2008 | Boling et al. |
| 2008/0198018 | A1 | 8/2008 | Hartley |
| 2008/0287151 | A1 | 11/2008 | Fjelstad et al. |
| 2009/0043445 | A1 | 2/2009 | Bishop et al. |
| 2009/0224966 | A1 | 9/2009 | Boling et al. |
| 2010/0103042 | A1 | 4/2010 | Bishop et al. |
| 2010/0299020 | A1 | 11/2010 | Koepf et al. |
| 2011/0016514 | A1 | 1/2011 | Carlo et al. |
| 2011/0093159 | A1 | 4/2011 | Boling et al. |
| 2011/0241903 | A1 | 10/2011 | Welch et al. |
| 2012/0299721 | A1 | 11/2012 | Jones |
| 2012/0299755 | A1 | 11/2012 | Jones |
| 2013/0088371 | A1 | 4/2013 | Welch et al. |
| 2013/0127617 | A1 | 5/2013 | Baade et al. |
| 2013/0141249 | A1 | 6/2013 | Pearlman et al. |
| 2013/0144770 | A1 | 6/2013 | Boling et al. |
| 2013/0144771 | A1 | 6/2013 | Boling et al. |
| 2013/0144805 | A1 | 6/2013 | Boling et al. |
| 2013/0147617 | A1* | 6/2013 | Boling .................. G08B 21/18 340/431 |
| 2013/0159214 | A1 | 6/2013 | Boling et al. |
| 2013/0185193 | A1 | 7/2013 | Boling et al. |
| 2013/0302757 | A1 | 11/2013 | Pearlman et al. |
| 2014/0012634 | A1 | 1/2014 | Pearlman et al. |
| 2014/0052605 | A1 | 2/2014 | Beerle et al. |
| 2014/0074692 | A1 | 3/2014 | Beerle et al. |
| 2014/0095061 | A1 | 4/2014 | Hyde |
| 2014/0125500 | A1 | 5/2014 | Baade |
| 2014/0125501 | A1 | 5/2014 | Baade |
| 2014/0202800 | A1* | 7/2014 | Breed .................... B60T 1/005 188/74 |
| 2014/0280658 | A1 | 9/2014 | Boling et al. |
| 2015/0006207 | A1 | 1/2015 | Jarvis et al. |
| 2015/0019270 | A1 | 1/2015 | Jarvis et al. |
| 2015/0024727 | A1 | 1/2015 | Hale-Pletka et al. |
| 2015/0066362 | A1 | 3/2015 | Meyer et al. |
| 2015/0067312 | A1 | 3/2015 | Lewandowski et al. |
| 2015/0095255 | A1* | 4/2015 | Hall ........................ G01S 19/16 705/333 |
| 2015/0186991 | A1 | 7/2015 | Meyer et al. |
| 2015/0356497 | A1 | 12/2015 | Reeder et al. |
| 2015/0373487 | A1 | 12/2015 | Miller et al. |
| 2016/0225072 | A1 | 8/2016 | Brady et al. |
| 2016/0282466 | A1 | 9/2016 | Epler |
| 2017/0262717 | A1 | 9/2017 | Drazan et al. |
| 2018/0300967 | A1 | 10/2018 | Winograd |
| 2018/0352198 | A1 | 12/2018 | Raasch et al. |
| 2019/0005442 | A1 | 1/2019 | Reeder et al. |
| 2019/0061692 | A1 | 2/2019 | Bobay et al. |

FOREIGN PATENT DOCUMENTS

| | | |
|---|---|---|
| CA | 2856796 A1 | 5/2013 |
| CA | 2867447 A1 | 9/2013 |
| CA | 2826902 A1 | 3/2014 |
| CA | 2828835 A1 | 4/2014 |
| CA | 2832185 A1 | 5/2014 |
| CA | 2846134 A1 | 9/2014 |
| MX | 2009011420 A | 3/2010 |
| MX | 2010001545 A | 8/2010 |
| WO | 2005086933 A2 | 9/2005 |
| WO | 2006028995 A2 | 3/2006 |
| WO | 2006028995 A3 | 2/2007 |
| WO | 2007146449 A2 | 12/2007 |
| WO | 2007146449 A3 | 10/2008 |
| WO | 2008121612 A1 | 10/2008 |
| WO | 2008144411 A1 | 11/2008 |
| WO | 2005086933 A3 | 12/2008 |
| WO | 2009021117 A1 | 2/2009 |
| WO | 2010047887 A2 | 4/2010 |
| WO | 2012162358 A1 | 11/2012 |
| WO | 2012162450 A1 | 11/2012 |
| WO | 2013078291 A1 | 5/2013 |
| WO | 2013138798 A1 | 9/2013 |
| WO | 2016061355 A1 | 4/2016 |

\* cited by examiner

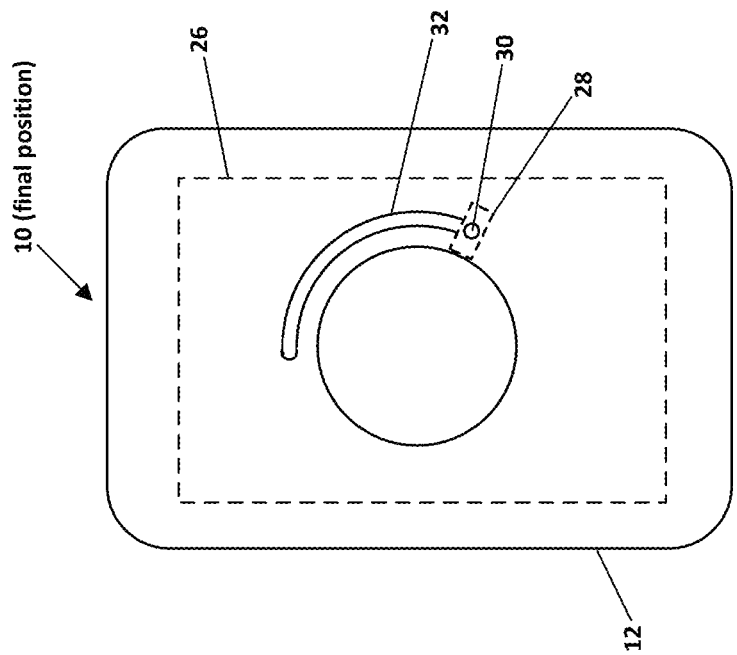
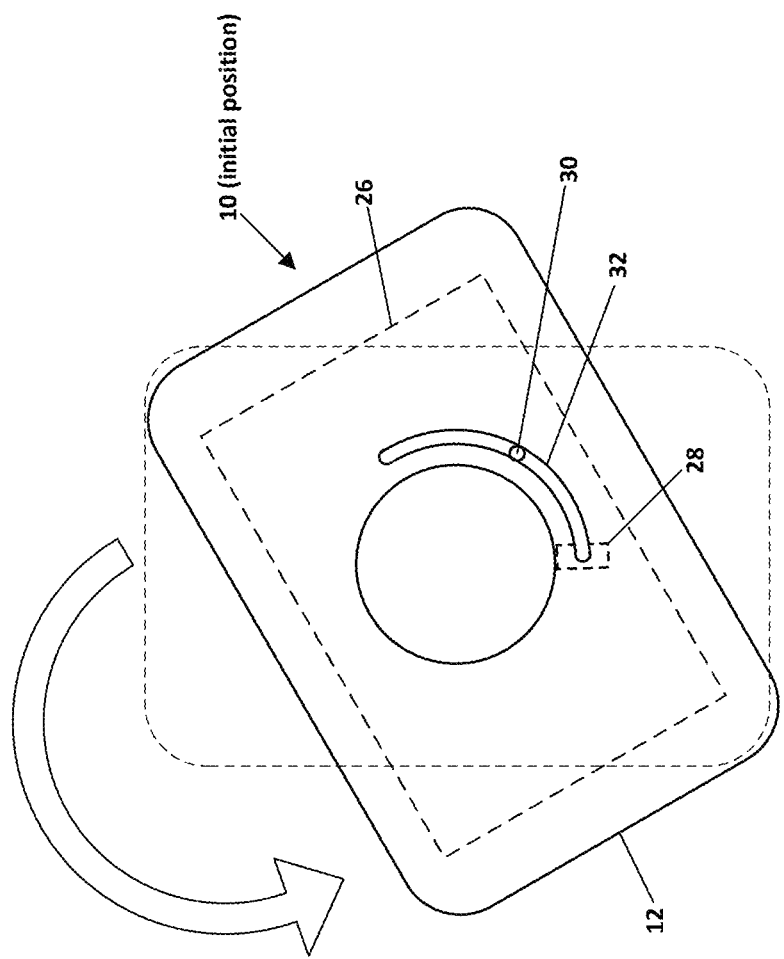
FIG. 3B
FIG. 3A (Top View)

(Side View)

APPARATUS AND METHOD FOR DETERMINING MOUNTING STATE OF A TRAILER TRACKING DEVICE

RELATED APPLICATIONS

This application claims priority to provisional patent application Ser. No. 62/640,283, filed Mar. 8, 2018, titled Apparatus and Method for Determining Mounting State of a Trailer Tracking Device.

FIELD

This invention relates to the field of mobile asset tracking and management. More particularly, this invention relates to a system for determining whether a cargo container tracking device is in close proximity to a cargo container.

BACKGROUND

Fleet management and cargo shipping companies use tracking devices installed on cargo containers to keep track of the location of the containers. Such devices typically use GPS receivers to determine location coordinates and wireless data transceivers to transmit location information and alert messages via wireless networks to central cargo management servers. The cargo containers may be twenty foot long or forty foot long foot shipping containers well known in the art or they may be cargo trailers of about the same dimensions that are pulled by tractors.

In most cases, the tracking devices are self-contained units that are mounted to an outside surface of a container or trailer. There is a need for cargo management personnel to know when a cargo tracking device is removed from a trailer or other cargo container. There is also a need to know whether or not a cargo container has been loaded onto a trailer.

Current solutions are indirect, expensive, hard to install, have limited sense distances, lead to false alerts, and can result in alerts that are not received when something happens.

What is needed, therefore, is a cargo tracking device that overcomes the deficiencies of the prior art.

SUMMARY

The above and other needs are met by a cargo tracking apparatus for detecting proximity to a cargo structure. In some embodiments, the cargo tracking apparatus includes a housing, and a cargo sensor, a location sensor, a wireless transmitter, and a processor that are disposed within the housing. The housing, which is configured to be attached to the cargo structure, has a sensor window. The cargo sensor, which is adjacent the sensor window, detects a portion of the cargo structure disposed adjacent the sensor window and generates a cargo sensor signal based on detection or lack of detection of the portion of the cargo structure. The location sensor generates location information based on the location of the cargo tracking apparatus. The processor receives the cargo sensor signal and the location information, and based thereon generates alert messages. The alert messages contain the location information and information indicative of whether the cargo structure is disposed in proximity to the cargo tracking apparatus. The wireless transmitter transmits the alert messages.

In some embodiments, the cargo sensor comprises a Time of Flight (ToF) sensor, an optical sensor, a reed switch, a Radio Frequency (RF) sensor, or a capacitive sensor.

In some embodiments, the sensor window is transparent at infrared wavelengths, and the cargo sensor is a ToF sensor that periodically makes a distance measurement through the sensor window, wherein the cargo sensor signal includes information indicative of the distance measurement. The processor generates an alert message if the distance measurement is greater than a predetermined amount, thereby indicating that the cargo tracking apparatus is not in proximity to the cargo structure.

In some embodiments, the sensor window is transparent at optical wavelengths, and the cargo sensor is an optical sensor that detects the presence of the portion of the cargo structure adjacent the sensor window. The processor generates an alert message if no portion of the cargo structure is detected adjacent the sensor window, thereby indicating that the cargo tracking apparatus is not in proximity to the cargo structure.

In some embodiments, the cargo structure includes a metallic portion, the sensor window is transparent to Radio Frequency (RF) signals, and the cargo sensor is an RF sensor that is operable to detect the presence of the metallic portion adjacent the sensor window. The processor generates an alert message if the metallic portion is not detected, thereby indicating that the cargo tracking apparatus is not in proximity to the cargo structure.

In some embodiments, the cargo structure includes a metallic portion, the sensor window in the housing is transparent to electric fields, and the cargo sensor is a capacitive sensor that is operable to detect the presence of the metallic portion of the cargo structure adjacent the sensor window. The processor generates an alert message if the metallic portion is not detected, thereby indicating that the cargo tracking apparatus is not in proximity to the cargo structure.

In some embodiments, the location sensor comprises a GPS receiver.

In some embodiments, the wireless transceiver comprises a cellular data transceiver or a Wi-Fi transceiver.

In another aspect, embodiments described herein are directed to an apparatus for detecting whether a cargo tracking device is attached to a cargo structure. The apparatus includes one or more first short-range radio frequency transceivers attached to the cargo structure. The cargo tracking device, which is configured to be attached to the cargo structure includes a location sensor, a second short-range radio transceiver, a processor, and a wireless transmitter. The location sensor generates location information based on the location of the cargo tracking device. The second short-range radio frequency transceiver communicates with the one or more first short-range radio frequency transceivers via one or more communication links when the second short-range radio frequency transceiver is within communication range of the one or more first short-range radio frequency transceivers. The second short-range radio frequency transceiver generates communication link status information indicating the status of the one or more communication links. The processor receives the location information and the communication link status information, and based thereon generates an alert message containing the location information and information indicative of whether the cargo structure is disposed in proximity to the cargo tracking device. The wireless transmitter transmits the alert message.

In some embodiments, the one or more first short-range radio frequency transceivers are components of one or more sensor devices attached to the cargo container for monitoring one or more physical characteristics of the cargo structure.

In some embodiments, at least one of the one or more first short-range radio frequency transceivers is a component of a proximity button attached to the cargo structure.

In some embodiments, the processor generates the alert message only when the communication link status information indicates that all of the one or more communication links have been interrupted.

In some embodiments, the first and second short-range radio frequency transceivers comprise Bluetooth transceivers.

In some embodiments, the wireless transceiver comprises a cellular data transceiver or a Wi-Fi transceiver.

In yet another aspect, embodiments described herein are directed to an apparatus for detecting proximity of a cargo container to a trailer. The apparatus includes a container sensing device and a cargo tracking device. The container sensing device includes a first housing, and a cargo sensor and a first short-range radio frequency transceiver that are disposed within the first housing. The first housing, which is configured to be attached to the trailer, has a sensor window. The cargo sensor, which is adjacent the sensor window, detects a portion of the cargo container that is adjacent the sensor window and generates cargo sensor information based on detection or lack of detection of the portion of the cargo container. The first short-range radio frequency transceiver transmits the cargo sensor information via a wireless communication network. The cargo tracking device includes a second housing, and a second short-range radio frequency transceiver, a processor, and a wireless transmitter disposed within the second housing. The second short-range radio frequency transceiver receives the cargo sensor information via the wireless communication network. The processor receives the cargo sensor information and based thereon generates an alert message containing information indicative of whether the cargo container is disposed in proximity to the trailer. The wireless transmitter transmits the alert message.

In some embodiments, the cargo tracking device includes a location sensor for generating location information based on the location of the cargo tracking device. The processor of these embodiments generates the alert message including the location information.

In some embodiments, the cargo sensor comprises a ToF sensor, an optical sensor, a Radio Frequency (RF) sensor, or a capacitive sensor.

In some embodiments, the first and second short-range radio frequency transceivers comprise Bluetooth transceivers.

In some embodiments, the wireless transceiver comprises a cellular data transceiver or a Wi-Fi transceiver.

In yet another aspect, embodiments described herein are directed to a cargo detection apparatus for detecting the presence or absence of a cargo container on a cargo trailer, wherein the cargo trailer has a chassis and one or more suspension springs. The cargo detection apparatus includes a housing configured to be attached to the chassis of the cargo trailer in proximity to at least one of the one or more suspension springs. Within the housing is an inductive coil, a processor, and a wireless transmitter. The inductive coil generates an inductive coil voltage having a level that is related to the distance between the inductive coil and the suspension spring. The processor executes instructions that determine a relative change in distance between the inductive coil and the suspension spring based at least in part on a change in the inductive coil voltage. The wireless transmitter transmits information indicative of the presence or absence of the cargo container on the cargo trailer.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIGS. 3A and 3B depict a cargo tracking device incorporating a reed switch and a magnet according to a first embodiment;

DETAILED DESCRIPTION

Embodiments of a tracking system described herein determine whether a cargo tracking device is installed on or in close proximity to a cargo structure. As the term is used herein, a "cargo structure" refers to a cargo trailer or cargo container or any other movable structure for holding and transporting cargo. Preferred methods include proximity testing and system proximity detection.

Figure 1A:
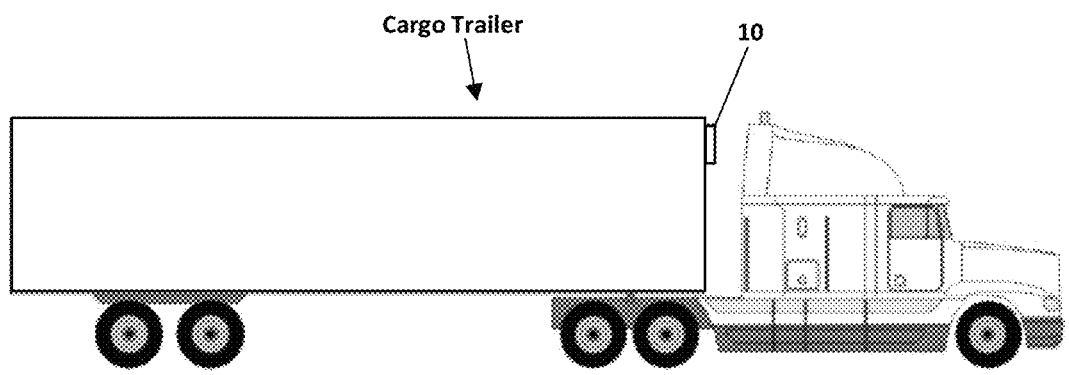
FIGS. 1A-1C depict cargo proximity detection and tracking systems according to embodiments described herein.
Figure 1B:
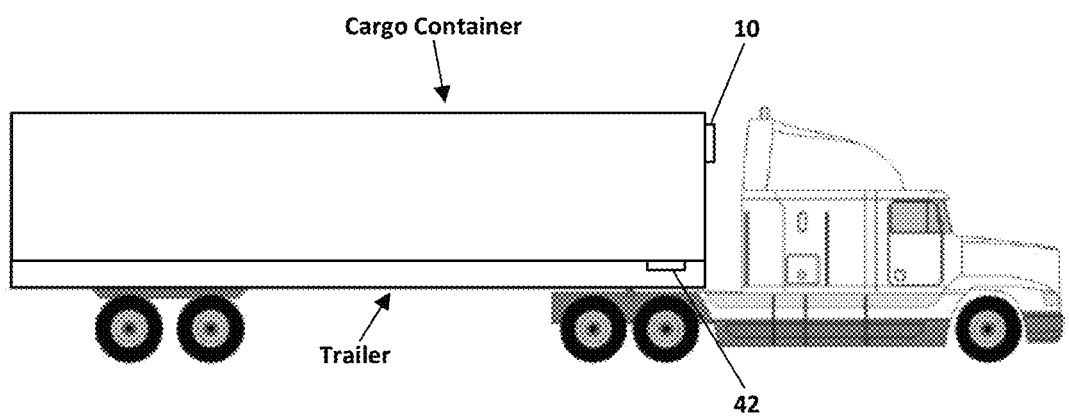
Figure 1C:
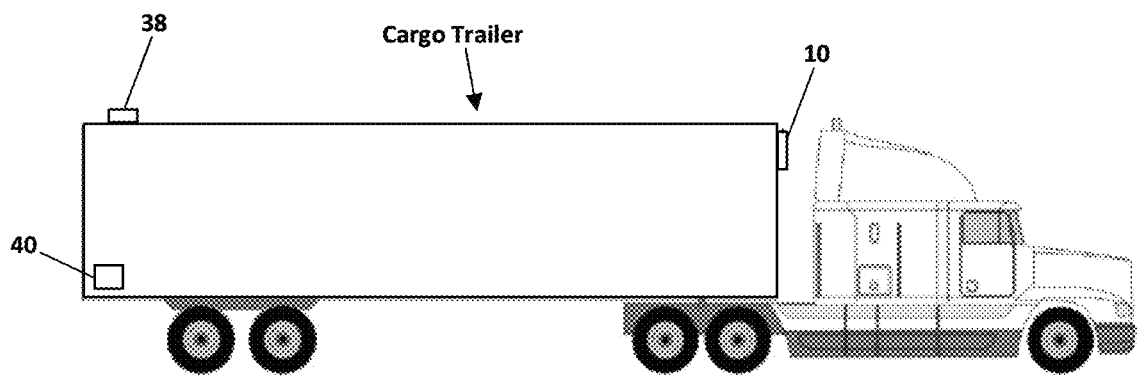

As shown in FIGS. 1A-1C, a cargo tracking device 10 may be installed on a cargo container or on a cargo trailer that is pulled by a tractor. In the embodiment of FIGS. 1A and 1C, the tracking device 10 preferably stays attached to the cargo trailer when the trailer is switched from one tractor to another. In the embodiment of FIG. 1B, the tracking device 10 may be installed on a cargo container that is transported on a flatbed trailer. This embodiment also includes a container sensor device 42 that detects the presence of the cargo container on the trailer. All of these embodiments implement one or more proximity sensing technologies as described hereinafter.

Figure 2:
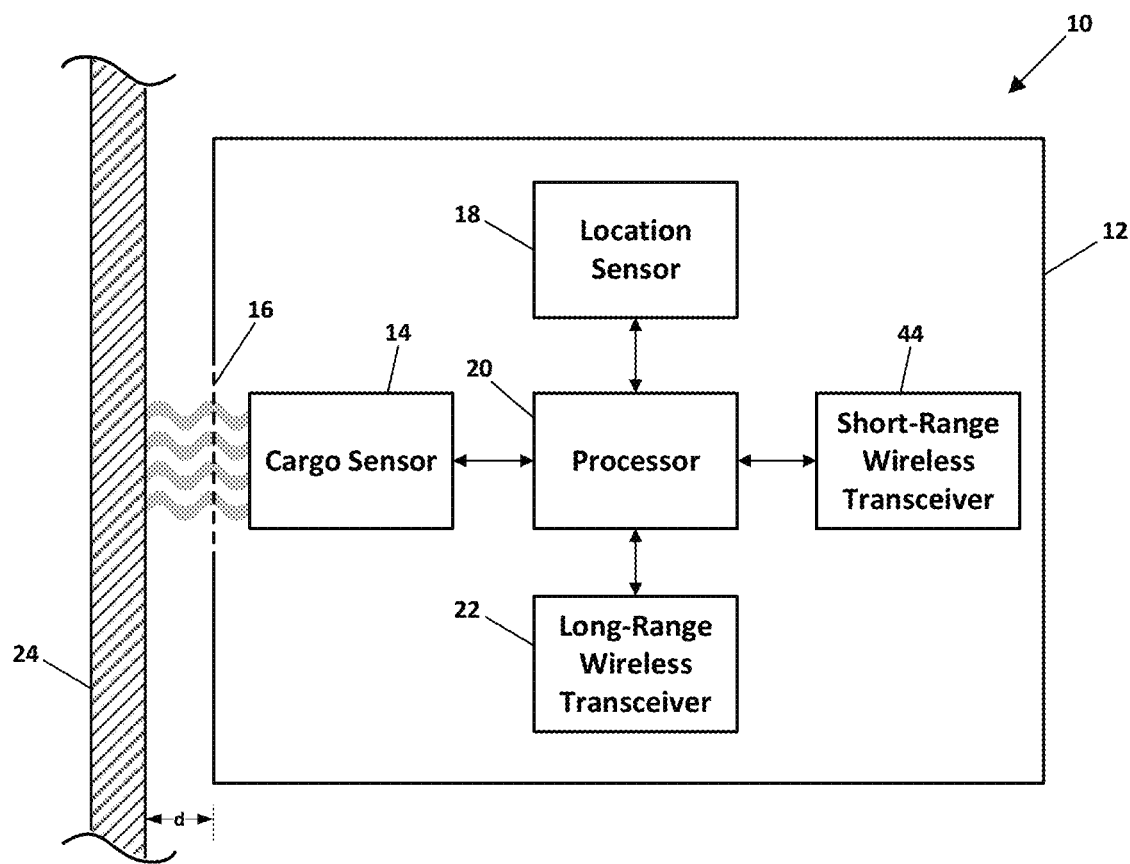
FIG. 2 depicts a cargo proximity detection and tracking apparatus according to a preferred embodiment.

FIG. 2 depicts a preferred embodiment of the cargo tracking device 10. The device 10 includes a cargo sensor 14, location sensor 18, processor 20, long-range wireless data transceiver 22, and short-range wireless data transceiver 44, all disposed within a housing 12. As described in more detail hereinafter, the cargo sensor 14 may be a Time of Flight (TOF) sensor, an optical sensor, a reed switch, an RF sensor, or a capacitive sensor. In some embodiments, the cargo sensor 14 may implement more than one of the above listed sensor technologies. Within a wall of the housing 12 is a sensor window 16 through which the cargo sensor 14 senses the presence or absence of a cargo structure 24. For example, the cargo structure 24 may be a wall or other surface of a cargo container. In some embodiments, the window 16 is the entire wall of the housing, or the entire housing, if the housing is transparent to the radiation of the sensor.

In a preferred embodiment, the location sensor 18 is a Global Positioning System (GPS) receiver that generates position coordinates based on timing signals received from GPS satellites. The long-range wireless data transceiver 22 is operable to transmit and receive data over wide area wireless data networks using one or more communication protocols, such as General Packet Radio Service (GPRS) or Long Term Evolution (LTE) wireless broadband technology. The short-range wireless data transceiver 44 is operable to transmit and receive data over local wireless data networks using one or more short-range communication protocols, such as Bluetooth, ZigBee, Z-Wave, WiFi, Thread, or WeMo. The processor 20 executes software instructions for processing information from the cargo sensor 14 and the location sensor 18, and generating alert messages based on the cargo sensor information and location information.

Proximity Testing

Time of Flight (ToF) Sensor

In some embodiments, the cargo sensor 14 comprises a Time of Flight (ToF) sensor, which is generally a laser-ranging camera system that resolves distance based on the known speed of light. Thus, a ToF sensor periodically measures the time-of-flight of a light signal between the sensor and a nearby object, such as the surface of the cargo structure 24. If the measured distance ("d" in FIG. 2) is greater than a predetermined very small distance, then it is assumed that the tracking device has been removed from the cargo container, in which case an alert message is generated. In a ToF sensor embodiment, the sensor window 16 is a portion of a wall of the housing 12 that is transparent to the wavelength of infrared light generated by the sensor. A very inexpensive ToF sensor may be used in this application is the ST Micro VL53L0X. Other Time of Flight technologies may be used here, such as ultrasonic sensors well known in the art.

Optical Sensor

In some embodiments, the cargo sensor 14 comprises an optical sensor that detects the presence of a surface close to the tracking device 10 using an optical proximity detector. An example is the Silicon Labs model Li1102. In the optical sensor embodiment, the sensor window 16 is a portion of a wall of the housing 12 that is transparent to the wavelength of visible light generated by the optical sensor.

Reed Switch

In some embodiments, the cargo sensor 14 comprises a reed switch, which is an electrical switch operated by an applied magnetic field. Generally, a reed switch includes a pair of contacts attached to ferromagnetic metal reeds within a hermetically sealed glass envelope. In some embodiments, the contacts are normally open, and they close when a magnetic field is applied. In other embodiments, the contacts are normally closed, and they open when a magnetic field is applied. In either case, the switch is actuated by bringing a magnet in close proximity to the switch. Once the magnet and the switch are separated, the switch goes back to its original position. Thus, in the reed switch embodiment of the cargo sensor 14, the sensor window 16 is a portion of a wall of the housing 12 that is transparent to a magnetic field.

As depicted in FIGS. 3A and 3B, one embodiment includes a reed switch 28 disposed within the housing 12 of the tracking device 10, and a corresponding disk-shaped magnet 30 disposed on the cargo structure where the tracking device 10 is to be attached. To address the challenge of how to install the magnet 30 on the cargo structure, the magnet 30 is initially removably attached to an interior cover of the tracking device 10, such as using a weak adhesive. On an outer surface of the housing 12 is a strong adhesive surface, such as 3M™ VHB™ tape. When installing the tracking device 10 to a cargo structure, the installer removes a protective cover from the strong adhesive tape and presses the exposed tape on the housing 12 against the cargo structure. During installation, the magnet 30 attaches to the mounting surface, and the weak adhesive breaks off. Using a "twist-on" method to attach the tracking device 10, a magnet-width groove with a radius that is co-centered with the radius of the mounting holder slides around the magnet that is secured to the mounting surface. While the installer twists the housing 12 of the tracking unit 10 to install it, the magnet 30 rides in the groove 32 until the tracker is seated. When the tracking device 10 is in its seated position, the internal reed switch 28 is in position above the magnet 30, which causes the reed switch 28 to be activated. If the tracking device becomes unseated, the reed switch 28 is deactivated, which results in an indication to the tracking device that the tracking device has become unseated.

Figure 4A:
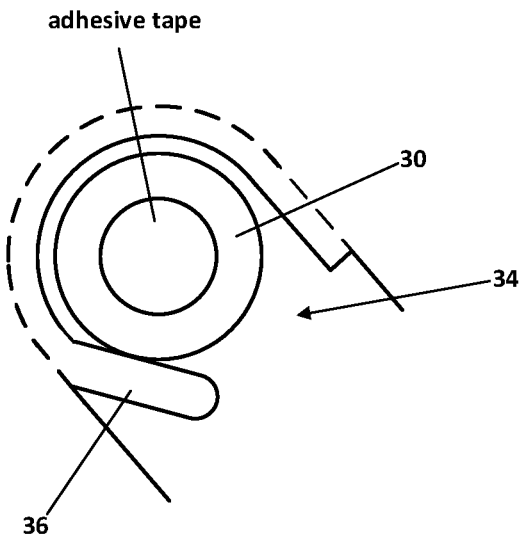
FIGS. 4A and 4B depict a cargo tracking device incorporating a reed switch and a magnet according to a second embodiment.
Figure 4B:
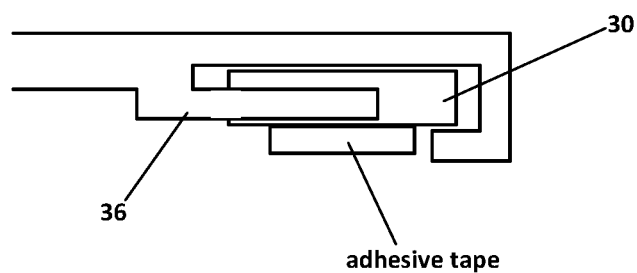

In an alternative embodiment, the magnet 30 may be held temporarily in place using plastic features in the housing 12 of the tracking device 10, rather than by a weak adhesive. As shown in FIGS. 4A and 4B, the housing 12 of this embodiment includes a carrying channel 34 and a snap feature 36 that holds the magnet 30 in place. Similar to what is described above, the installer removes a protective film from a strong adhesive backing, and when the tracking device 10 is installed on the cargo structure, the adhesive bonds the magnet 30 to the cargo structure. As the installer twists the tracking device 10, the snap feature 36 releases the magnet 30 from its original position and it remains fixed to the trailer while the tracking device 10 is rotated.

Radio Frequency (RF) Sensor

In some embodiments, the cargo sensor 14 comprises an RF sensor that includes an antenna, an RF transmitter, and an RF receiver. In these embodiments, the sensor window 16 is a portion of a wall of the housing 12 that is transparent to RF energy generated by the RF sensor, and the surface of the cargo structure that is disposed in close proximity to the RF sensor is metallic. The RF sensor periodically transmits a pulse or a string of pulses through the sensor window 16. If a metallic structure is present on the opposite side of the window 16, the pulse or string of pulses is reflected and the returned pulse or pulse string is altered by being reflected. By analysis of the return signal, the RF receiver determines whether the RF sensor's antenna is close to a metallic surface. In an alternative embodiment, the impedance of the antenna is continuously or periodically measured by an analog circuit. The proximity of a metallic surface alters the impedance of the antenna. When the impedance or other electrical characteristic of the antenna changes by a threshold amount, this indicates that the antenna has been separated from the metallic plane, and an alert message is generated.

Capacitive Sensor

In some embodiments, the cargo sensor 14 comprises a capacitive sensor. Such sensors are used in smartphones to detect the presence of a finger in close proximity to a display screen. Using a large sense wire, capacitive sensor technology can be used to detect the presence of a large metal body in proximity to the sensor 14. In these embodiments, the sensor window 16 is a portion of a wall of the housing 12 that is transparent to electromagnetic energy generated by the capacitive sensor. In an exemplary embodiment, the capacitive sensor includes a long sense wire to implement CapSense capacitive touch sensing technology offered by Cypress Semiconductor Corp. With this technology, the sensing distance is directly proportional to the length of the sense wire. For example, a 15 cm sensing distance may be implemented using a sense wire that is 15 cm in length.

System Proximity

System proximity embodiments rely on connectivity with certain other system components. If the connectivity is broken, then it is determined that the tracking device has been removed. These embodiments have a distinct advantage in that the connectivity function can be combined with other system functions, thereby reducing overall system cost, or providing additional functionality at the same cost. In preferred embodiments, the system proximity embodiment may take any one of the forms described herein.

Dedicated Proximity Button

FIG. 1C depicts an exemplary embodiment that includes a proximity button 38 mounted on a cargo trailer in a different location from that of the tracking device 10. The proximity button 38 includes a short-range RF transceiver, such as a Bluetooth low-energy (LE) transceiver. The short-range RF transceiver in the button 38 is paired with a short-range RF transceiver in the tracking device 10, which may also be a Bluetooth LE transceiver. If the short-range RF transceiver of the tracking device 10 loses pairing with the short-range RF transceiver of the proximity button 38, this indicates that the tracking device 10 has been separated from the trailer. Upon this indication, the tracking device 10 transmits an alert message indicating that the connection has been lost, and appropriate action can be taken. The button 38 may be powered by a primary cell, or a secondary cell which is recharged by a primary cell, a solar panel, vibration energy harvesting, or other environmental harvesting methods.

The Proximity Button may also include its own long-range transceiver and location sensor, which is/are only activated when it is no longer connected with the tracking device 10. Thus if the tracking device 10 is destroyed, the Proximity Button may independently report the location of the cargo container.

It will be appreciated that the RF connection technology is not limited to Bluetooth LE, but may be any RF connectivity protocol familiar to a person having ordinary skill in the art. These RF connectivity protocols may also include ZigBee, Z-Wave, WiFi, Thread, WeMo or any other standard or proprietary wireless protocol. These RF connectivity methods may use industrial, scientific, and medical (ISM) bands such as the 433 Mhz, 900 MHz, 2.4 GHz, 61 GHz, or any other ISM band. They may also use a licensed band if available.

Integrated System Functions

As depicted in FIG. 1C, in addition to or instead of the proximity button 38, the proximity function may be implemented using a trailer door sensor 40. Generally, the door sensor 40 is necessarily located at the back of the trailer near the door, whereas the tracking device 10 is usually mounted on the front of the trailer near the attachment to the tractor. The door sensor 40 is preferably powered by a primary power cell, or a secondary cell system that is charged through a mechanism that generates power through the motion of the trailer, such as a vibration energy harvester. The door sensor 40 preferably includes an RF transceiver, such as a Bluetooth LE transceiver, that maintains an RF connection through a wireless interface with the tracking device 10. The door sensor 40 may sense the open/closed state of the trailer door using proximity sensing methods similar to those discussed herein. Although the RF wireless interface could be Bluetooth LE, a preferred embodiment uses a standard transceiver in the 900 MHz range to provide better connectivity. Several protocols could be used in various embodiments, such as ZigBee, Z-Wave, Thread, and WeMo, or a proprietary interface.

In the embodiment of FIG. 1C, the door sensor 40 not only provides the status of the door, but it also provides a presence indication, similar to the dedicated proximity button 38 discussed above. This presence indication function could also be built into other sensors on the trailer, such as weight sensors, tire pressure sensors, temperature sensors, or any other sensor. A preferred embodiment may also improve reliability by looking for the presence of multiple paired sensors, and determining that the tracking device 10 has been removed based on the absence of signals from all of the paired sensors. This limits the possibility of false positives that could be triggered if there is cargo in the trailer that generates RF interference, thereby causing one or more, but not all, of the sensors to lose connection to the tracking device 10.

Cargo Container Detection on Flatbed Trailer

Figure 5:
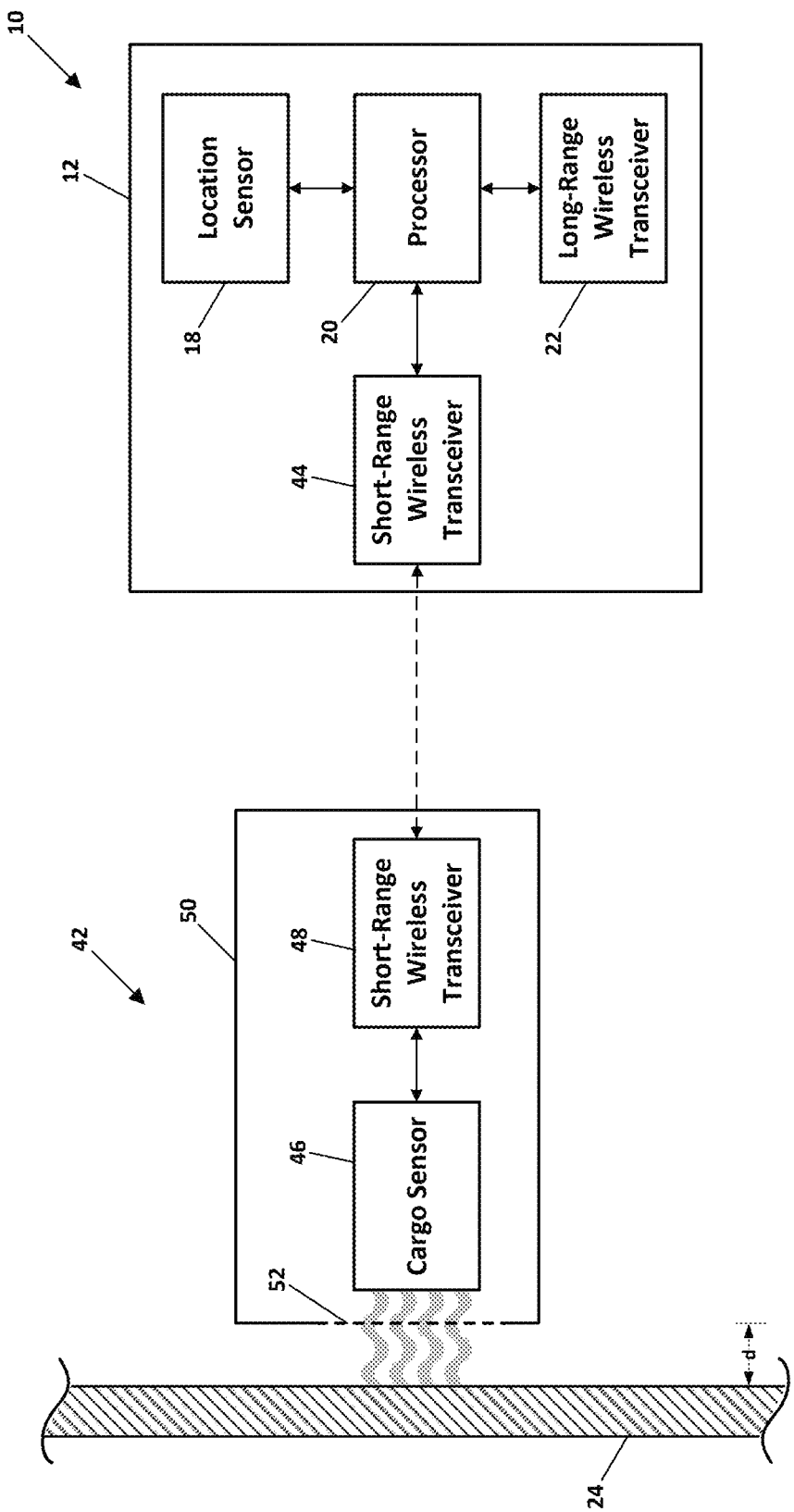
FIG. 5 depicts a cargo proximity detection and tracking apparatus according to an alternative embodiment.

FIGS. 1B and 5 depict a first embodiment for detecting and reporting whether a cargo container is present on a flatbed trailer. Using this first embodiment, the operator of the fleet of trailers can determine remotely when a container is separated from or dropped onto the trailer. This embodiment includes a container sensing device 42 mounted on the flatbed trailer. The container sensing device 42 includes a cargo sensor 46 and a short-range wireless data transceiver 48 disposed within a housing 50. The cargo sensor 46 preferably implements one or more of the above listed sensor technologies. Within one or more of the walls of the housing 50 is a sensor window 52 through which the cargo sensor 46 senses the presence or absence of a cargo container 24.

The embodiment of FIGS. 1B and 5 also may include a tracking device 10 attached to the cargo container. The tracking device 10 may include a location sensor 18, processor 20, long-range wireless data transceiver 22, and short-range wireless data transceiver 44, all disposed within a housing 12. Preferably, the container sensing device 42 is operable to communicate with the tracking device 10 via a communication link established between the short-range wireless data transceiver 48 and the short-range wireless data transceiver 44. However the cargo sensor and tracking device may also be integrated into one unit, such as in FIG. 2. In this case, the cargo sensor 14 would look through the window to detect the presence or absence of a cargo container rather than determining if the tracking device 12 is connected to a trailer as in previous embodiments.

Generally, the bottoms of cargo containers are corrugated, and as a result, the distance between the bottom of the container and the surface of the trailer may range from almost zero to about 65 mm. Prior sensing technologies have been limited to a sense distance of around 15 mm, and as a result do not function reliably to sense a cargo container on a flatbed trailer. Using the technologies described herein, such as Time of Flight, RF detection, or capacitive detection, the container sensing device 42 can detect the presence of a container on a trailer. RF detection and capacitive detection have additional advantages in that dirt or scratches on the sensor housing will not impact their ability to detect the container.

The power consumption of the container sensing device 42 is typically very low. As a result, the device 42 can be powered solely by a primary cell that lasts for many years. This is particularly advantageous as the device 42 can communicate with the tracking device 10 via Bluetooth or other low-power wireless technology. The housing 50 of the device 42 can be completely sealed, thereby reducing the cost of construction. The housing 50 can also be easily and quickly mounted on the trailer, as there is no need to run a wire from the device 42 to the tracking device 10.

Figure 7:
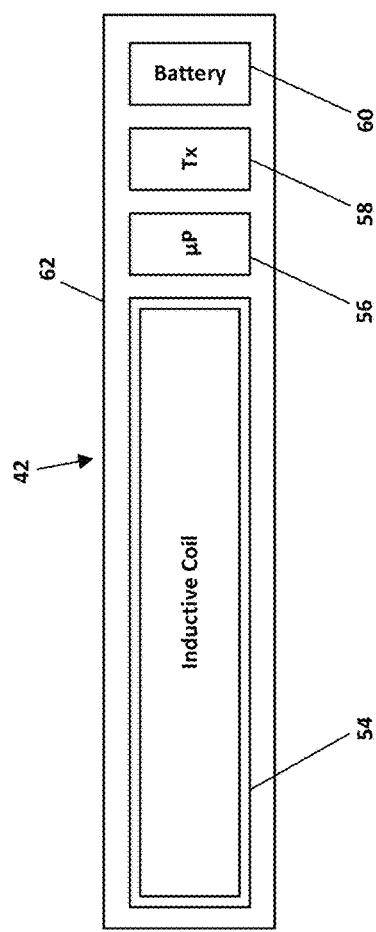
FIGS. 6 and 7 depict a cargo proximity detection apparatus according to an alternative embodiment.
Figure 6:
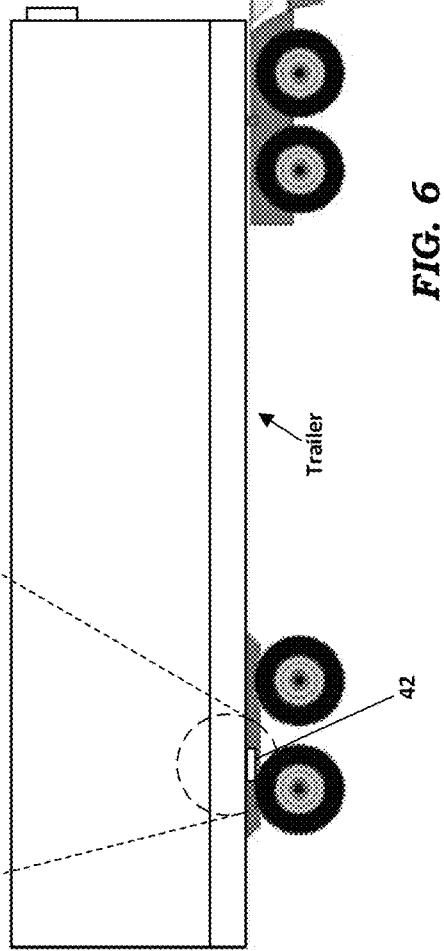

FIGS. 6 and 7 depict a second embodiment for detecting and reporting whether a cargo container is present on a flatbed trailer. Using this second embodiment, the operator of the fleet of trailers can determine remotely when a container is separated from or dropped onto the trailer based on a measurement of the deflection of the suspension of the trailer chassis when the container is mounted or dismounted. The distance of movement of the suspension is relative to the weight of the container. This embodiment includes an inductive sensing device 42 mounted on the underside of a chassis beam of the flatbed trailer in proximity to a suspension spring. The inductive sensing device 42 includes a housing 62 in which an inductive sensing coil 54, an inductive sensing microprocessor 56, a short-range wireless data transceiver 58, and a primary cell battery 60 are disposed. The short-range wireless data transceiver 58 may be a Bluetooth module. The battery 60 is configured to last ten years or longer.

In one preferred embodiment, the form factor of the housing 62 of the device 42 is three inches wide by 18 inches long by two inches high. The device is preferably mounted underneath the main chassis beam that runs the length of the trailer. The device 42 is attached to the chassis beam in a location that places the device 42 directly over one or more of the suspension springs. The distance from the device 42 to the springs is preferably between six and nine inches.

The device 42 continually monitors the relative proximity between the device 42 and the suspension spring. As a container is placed on the chassis, the suspension spring moves closer to the inductive sensing coil 54 of the device 42 and this distance change is indicated by a change in voltage on the coil 54. The device 42 is designed with enough sensitivity to detect small displacements in the suspension and therefore be able to determine with relative accuracy the weight of the container based on the displacement in the suspension spring.

In the preferred embodiment, the area of the inductive coil 54 determines the distance at which movement is detected. Various models of the device 42 may have coils 54 if various sizes, such that a model may be selected that has a coil size that maximizes the resolution in the distance of the sensing for a particular chassis and suspension configuration.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A cargo tracking apparatus for detecting proximity to a cargo structure, the cargo tracking apparatus comprising:
    a housing having a sensor window, the housing configured to be attached to the cargo structure;
    a cargo sensor disposed within the housing and adjacent the sensor window, the cargo sensor for detecting a portion of the cargo structure disposed adjacent the sensor window and for generating a cargo sensor signal based on detection or lack of detection of the portion of the cargo structure;
    a location sensor disposed within the housing for generating location information based on a location of the cargo tracking apparatus;
    a processor disposed within the housing for receiving the cargo sensor signal and the location information, and based thereon generating alert messages containing the location information and information indicative of whether the cargo structure is disposed in proximity to the cargo tracking apparatus; and
    a wireless transmitter disposed within the housing for transmitting the alert messages.

2. The cargo tracking apparatus of claim 1 wherein the cargo sensor comprises one or more of a Time of Flight (TOF) sensor, an optical sensor, a reed switch, a Radio Frequency (RF) sensor, and a capacitive sensor.

3. The cargo tracking apparatus of claim 2 wherein:
    the sensor window in the housing is transparent at infrared wavelengths;
    the cargo sensor is a Time of Flight sensor that periodically makes a distance measurement through the sensor window, wherein the cargo sensor signal includes information indicative of the distance measurement; and
    the processor generates an alert message if the distance measurement is greater than a predetermined amount, thereby indicating that the cargo tracking apparatus is not in proximity to the cargo structure.

4. The cargo tracking apparatus of claim 2 wherein:
    the sensor window in the housing is transparent at optical wavelengths;
    the cargo sensor is an optical sensor that detects the presence of the portion of the cargo structure adjacent the sensor window; and
    the processor generates an alert message if no portion of the cargo structure is detected adjacent the sensor window, thereby indicating that the cargo tracking apparatus is not in proximity to the cargo structure.

5. The cargo tracking apparatus of claim 2, wherein the cargo structure includes a metallic portion, and wherein:
    the sensor window in the housing is transparent to Radio Frequency (RF) signals;
    the cargo sensor is a Radio Frequency (RF) sensor that is operable to detect presence of the metallic portion adjacent the sensor window; and
    the processor generates an alert message if the metallic portion is not detected, thereby indicating that the cargo tracking apparatus is not in proximity to the cargo structure.

6. The cargo tracking apparatus of claim 2, wherein the cargo structure includes a metallic portion, and wherein:
    the sensor window in the housing is transparent to electric fields;
    the cargo sensor is a capacitive sensor that is operable to detect the presence of the metallic portion of the cargo structure adjacent the sensor window; and
    the processor generates an alert message if the metallic portion is not detected, thereby indicating that the cargo tracking apparatus is not in proximity to the cargo structure.

* * * * *